UNITED STATES PATENT OFFICE.

EDWARD TIVET, OF PHILADELPHIA, PENNSYLVANIA.

IMPROVEMENT IN PRODUCING LEATHER FROM SHEEP'S STOMACHS.

Specification forming part of Letters Patent No. 208,548, dated October 1, 1878; application filed August 10, 1878.

*To all whom it may concern:*

Be it known that I, EDWARD TIVET, of the city and county of Philadelphia, and State of Pennsylvania, have invented a new and useful Improvement in Leather or Integuments from the Stomachs of Animals, which improvement is fully set forth in the following specification.

My invention consists in treating the stomachs of sheep in such manner that a light and serviceable leather or integument is produced, which is admirably adapted for purses, bags, and other articles mainly of pouch form.

In carrying out my invention, I take the stomach proper of the sheep, in the state in which it comes from the animal, the gut and ligaments being previously or subsequently severed, and empty it, and, while it is yet fresh, I remove by a dull scraper the softest or least adherent layers of the external covering or serous surface, thus leaving the firmest part of the peritoneal or serous surface adhering to the muscular or middle membranes. The stomach is now turned inside out and brushed, so as to remove the mucous surface, thus leaving only the muscular tunic or middle membranes, covered on the outside by the portion of the serous membrane that remains, the result whereof is a thin white integument, presenting on the inside a multitude of *papillæ*, intimately adhering to it, which integument is to be treated so as to be preserved and its pliability retained. This may be accomplished by any known process of tawing or tanning, some glycerine being used for keeping the pelt in a suitable state of moisture.

Among these processes I will mention the following: For tawing about ten pounds of the prepared integuments, form a paste of one-half pound of alum dissolved in one-half gallon of water, one and a half pound of best wheat flour, the yelks of one dozen eggs, and five ounces of pure concentrated glycerine, more or less, all well mixed together.

The integuments are placed in the paste, and permitted to remain therein for about one day, after which they are wrung out and hung up to dry to a certain extent, after which the integuments, as partially dry, are stretched, and a small quantity of linseed-oil passed over the muscular surface of the integuments, after which the integuments are permitted to dry to full extent.

If desired, dye-stuff may be advantageously applied to the integuments prior to the treatment thereof with the above paste.

It will be seen that the integuments as produced are in the form of sacks or pouches, and they are admirably adapted for light purses, tobacco-bags, and other useful and fancy articles; but the integument may also be formed into sheets or strips.

I am aware that skins of animals have been cured by both tanning and tawing processes, and that strings have been formed from sheep's intestines. I am also aware of the existence of gold-beaters' skins, or the peritoneal coat of the *cæcum* or blind gut of neat cattle. Such processes and articles I do not, therefore, claim; but, Having fully described my invention, what I do claim as new, and desire to secure by Letters Patent, is—

1. The treatment of the stomach of sheep in a fresh state to produce leather, the same consisting in removing the softest or least adhesive layers of the external covering or serous substance and the inner mucous surface, thus leaving the muscular tunic or middle membrane covered on its outside with the remaining serous membrane, the two membranes forming an integument, which is afterward tawed or tanned, substantially as described.

2. As a new article of manufacture, the herein-described leather produced in pouch form from the stomachs of sheep, substantially as and for the purpose set forth.

ED. TIVET.

Witnesses:
SAML. M. GRICE,
JOHN A. WIEDERSHEIM.